United States Patent
Mourlam et al.

(10) Patent No.: US 10,435,283 B1
(45) Date of Patent: Oct. 8, 2019

(54) TURNTABLE LEVELING SYSTEM

(71) Applicant: Altec Industries, Inc., Birmingham, AL (US)

(72) Inventors: Timothy J. Mourlam, Kansas City, KS (US); Aaron Beck, Kansas City, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 16/142,942

(22) Filed: Sep. 26, 2018

(51) Int. Cl.
| | |
|---|---|
| *B66F 13/00* | (2006.01) |
| *B60S 9/02* | (2006.01) |
| *B60S 9/12* | (2006.01) |
| *B66F 17/00* | (2006.01) |
| *B66F 11/04* | (2006.01) |

(52) U.S. Cl.
CPC ............... *B66F 13/00* (2013.01); *B60S 9/02* (2013.01); *B66F 11/044* (2013.01); *B66F 17/006* (2013.01); *B60S 9/12* (2013.01)

(58) Field of Classification Search
CPC ...... B66F 13/00; B66F 11/044; B66F 17/006; B66F 9/0655; B60S 9/02; B60S 9/12
USPC .......................................................... 701/50
See application file for complete search history.

(56) References Cited

U.S. PATENT DOCUMENTS

| | | | | |
|---|---|---|---|---|
| 5,082,085 A | * | 1/1992 | Ream | B66F 11/044 182/148 |
| 5,580,095 A | * | 12/1996 | Fukumoto | B60S 9/12 280/766.1 |
| 5,813,697 A | * | 9/1998 | Bargenquast | B60G 9/02 280/6.154 |
| 2003/0173151 A1 | * | 9/2003 | Bodtke | B66F 11/046 182/18 |
| 2005/0007553 A1 | * | 1/2005 | Romanoff | B66F 11/048 352/243 |
| 2005/0189168 A1 | * | 9/2005 | Bean | B66F 11/046 182/2.8 |
| 2005/0189179 A1 | * | 9/2005 | Bean | B66F 11/046 187/277 |
| 2012/0211301 A1 | * | 8/2012 | Clark | B66F 11/044 182/2.2 |
| 2016/0236922 A1 | * | 8/2016 | Merlo | B66F 9/07559 |
| 2017/0291802 A1 | * | 10/2017 | Hao | B60P 1/34 |

* cited by examiner

*Primary Examiner* — Bao Long T Nguyen
(74) *Attorney, Agent, or Firm* — Erise IP, P.A.

(57) ABSTRACT

A turntable leveling system is configured to level a boom turret of an aerial device. This allows the boom turret to be leveled more than with level correction by outriggers. The turntable leveling system includes a lower turntable wedge and an upper turntable wedge. Each of the lower turntable wedge and the upper turntable wedge is independently rotatable relative to the chassis. The turntable leveling system is configured to be installed between a chassis and the boom turret of an aerial device. The turntable leveling system may further comprise a central turntable wedge disposed between the upper turntable wedge and the lower turntable wedge.

20 Claims, 9 Drawing Sheets

TURNTABLE LEVELING SYSTEM

BACKGROUND

1. Field

Embodiments of the invention relate to the utility vehicles and the stabilization thereof. More specifically, embodiments of the invention relate to a turntable leveling system.

2. Related Art

Utility workers utilize aerial devices, cranes, and other utility vehicles to perform numerous tasks. Utility vehicles typically include a boom assembly that aids in performing the task. In the case of an aerial device, the boom assembly supports a utility platform in which one or more utility workers stand. In the case of a crane, the boom assembly lifts and moves heavy loads. In these and other scenarios, a stable utility vehicle is of importance to prevent the tipping or collapse.

The boom assembly is configured to operate from a level base. Without a level base, the forces and stresses applied to the boom assembly will be unevenly distributed. The leveling is performed by ensuring that the chassis of the vehicle is stable. However, conditions in the field can vary widely such that fully level may not be accomplished with prior art systems. In these instances, the operator would either have to dig on an uphill side to level the area, build up on a downhill side (also known as "cribbing"), or move to another location. What is lacking in the prior art is a structure to provide additional leveling of a boom turret beyond leveling possible to a chassis, such that a boom is operating from a level platform.

SUMMARY

Embodiments of the invention solve the above-mentioned problems by providing a turntable leveling system. The turntable leveling system provides additional leveling of a boom turret beyond the leveling possible to a chassis, such that a boom is operating from a level platform. Thus, the boom turret can be level, even if the chassis is not fully level. This allows for boom operations in locations and conditions which were not previously possible. This also allows for fine tuning of the leveling performed by an outrigger system or other chassis-leveling device.

A first embodiment of the invention is directed to a utility vehicle comprising a chassis, a boom turret, and a turntable leveling system. The boom turret is rotatably secured to the chassis and configured to support a boom thereon. The turntable leveling system is disposed between the chassis and the boom turret. The turntable leveling system is configured to level the boom turret relative to the chassis, and includes at least one turntable wedge.

A second embodiment of the invention is directed to a turntable leveling system configured to level a boom turret associated with a boom assembly, the system comprising a lower turntable wedge and an upper turntable wedge. Each of the lower turntable wedge and the upper turntable wedge is independently rotatable relative to the chassis. The turntable leveling system is configured to be installed between a chassis and a boom turret. The turntable leveling system may further comprise a central turntable wedge disposed between the upper turntable wedge and the lower turntable wedge.

A third embodiment of the invention is directed to a computerized method of leveling a boom turret comprising: determining a chassis angle of a chassis relative to a true downward direction; determining an orientation set for a turntable leveling system such that a turntable angle will be equal in magnitude and opposite the chassis angle; and instructing the turntable leveling system to rotate to the orientation set, wherein rotating the turntable leveling system will level the boom turret. The orientation set of the turntable leveling system is set such that a turntable angle is equal in magnitude and opposite to the chassis angle, such that the turntable angle cancels the chassis angle so as to render a top portion of the turntable leveling system level with a true horizontal position. Another embodiment where the system can update the turntable angle as the turntable is rotated from first working position to second working position.

Additional embodiments of the invention are directed to a method of leveling a boom turret, a method of leveling a boom assembly. Still other embodiments of the invention may be directed to a boom assembly including a boom, a boom turret, and a turntable leveling system. Yet still other embodiment of the invention may be directed to a chassis for utility vehicle including the turntable leveling system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
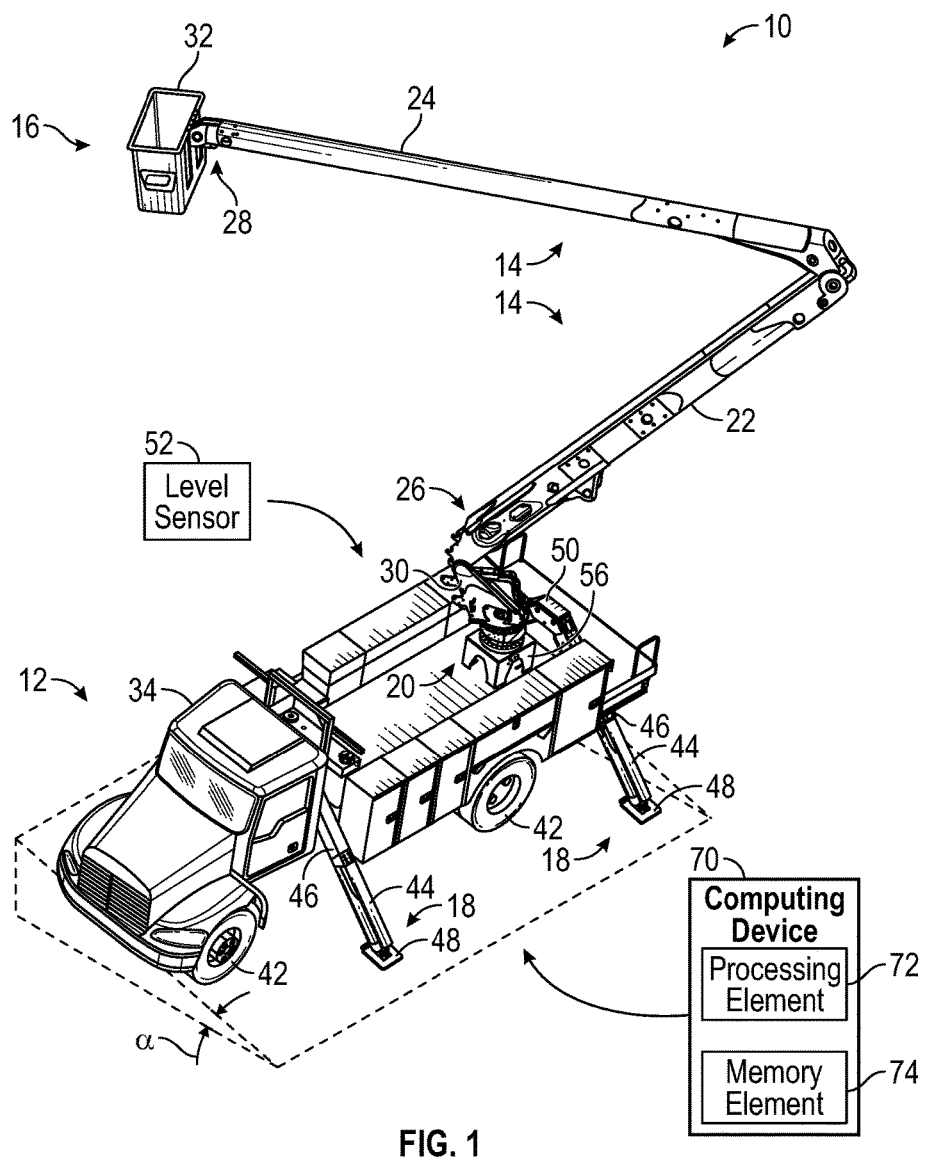
FIG. 1 is a perspective view of an aerial device disposed on a non-level surface.
Figure 2:
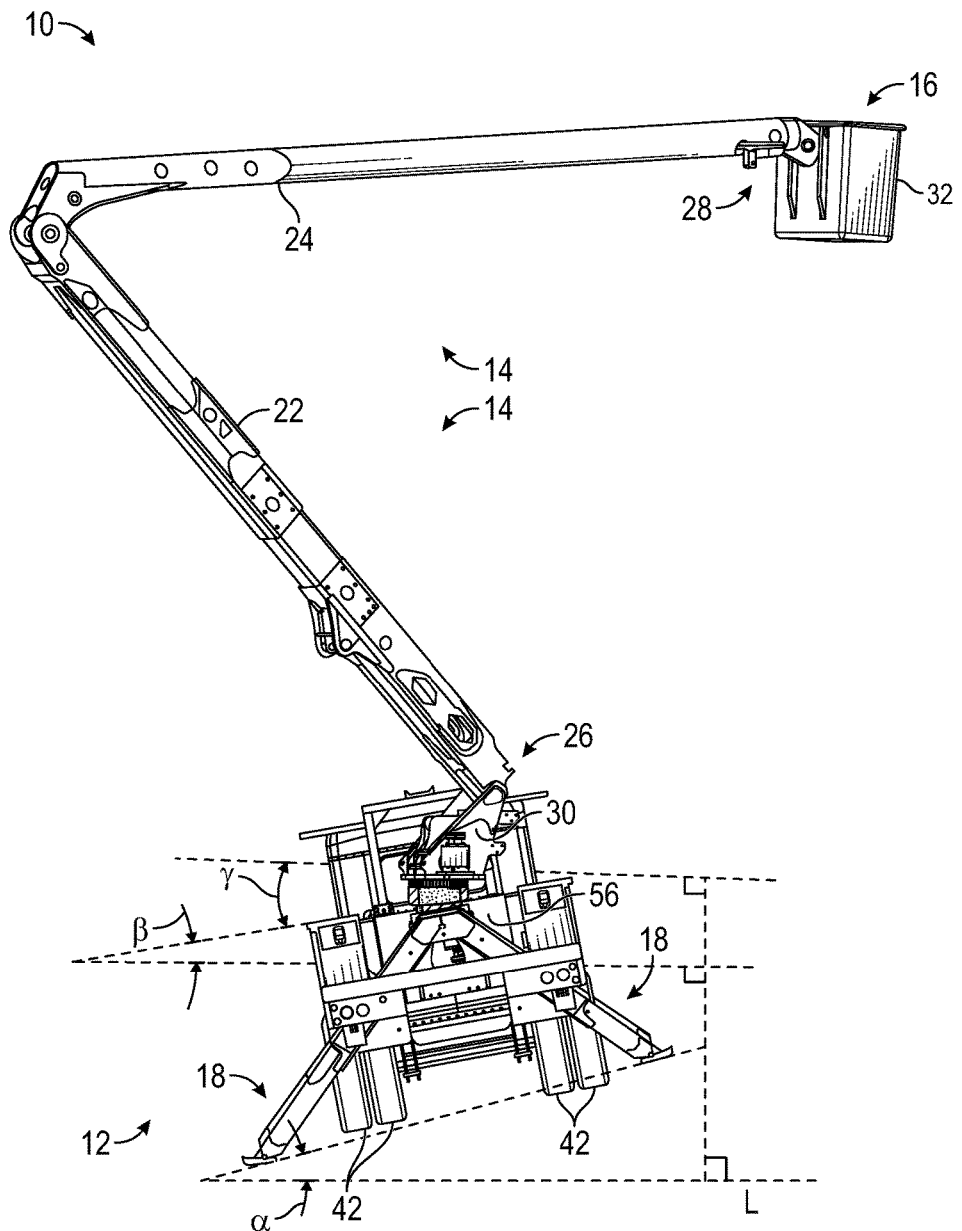
FIG. 2 is a rear view of the aerial device of FIG. 1, disposed on the non-level surface.
Figure 3A:
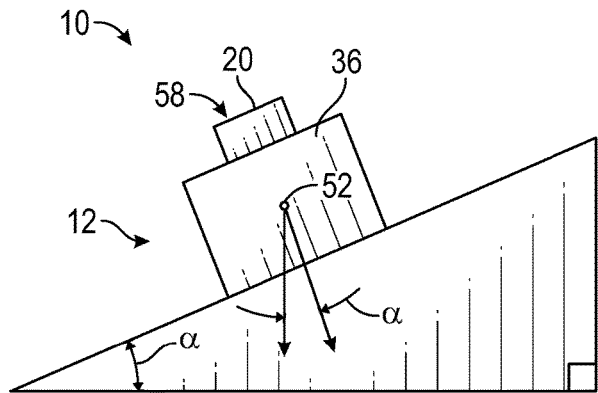
Figure 3B:
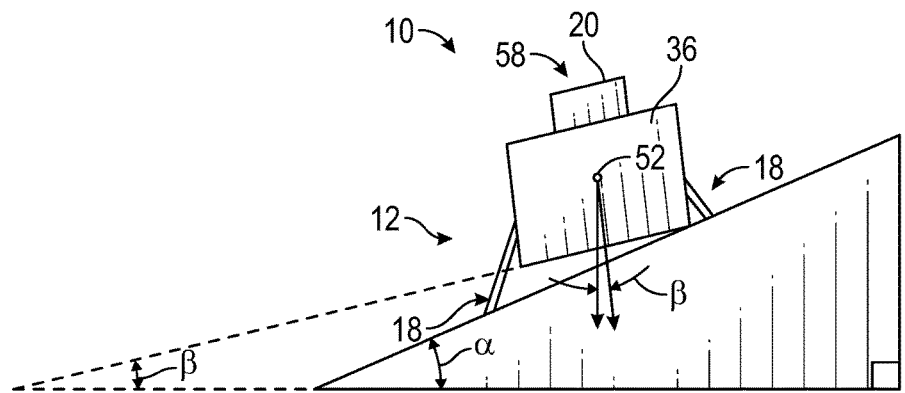
Figure 3C:
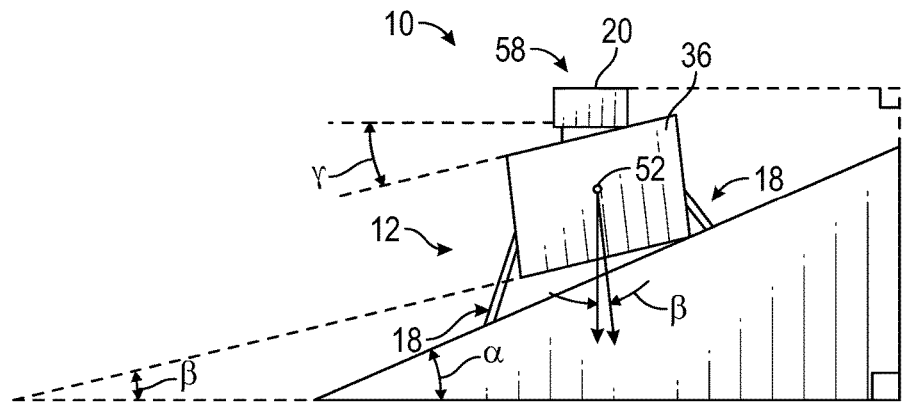
Figure 4A:
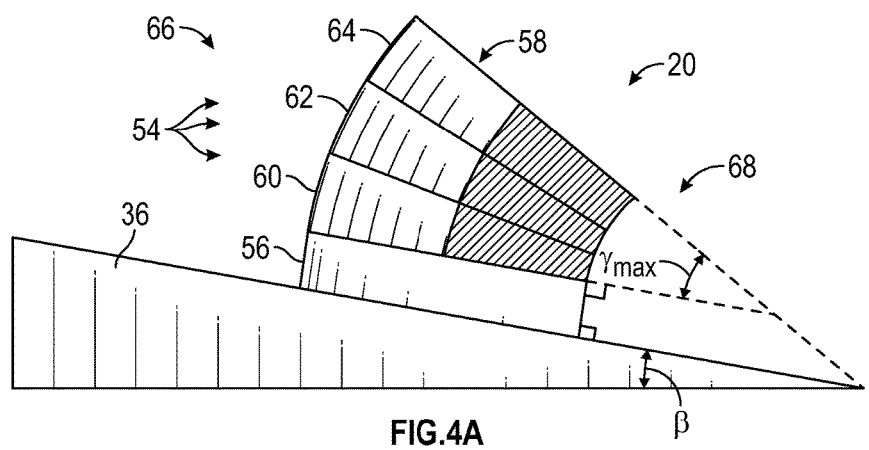
Figure 4B:
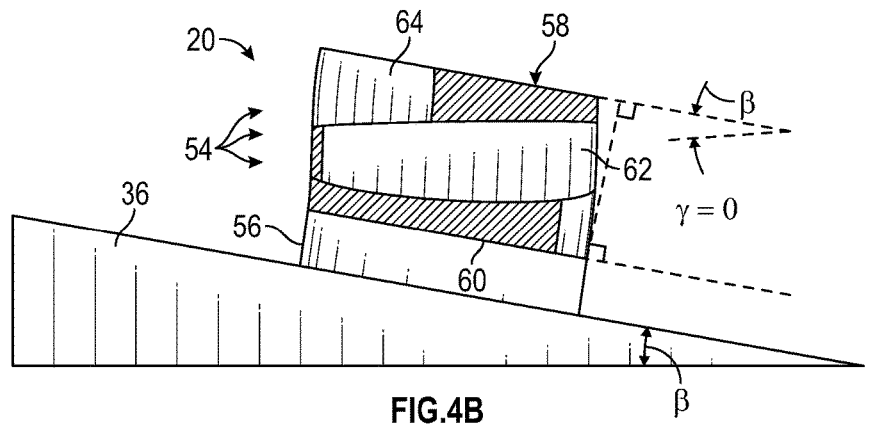
Figure 4C:
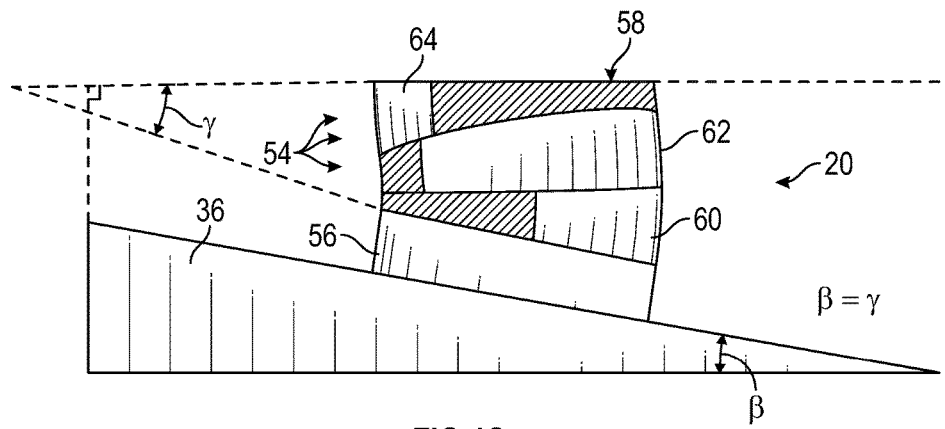
Figure 5:
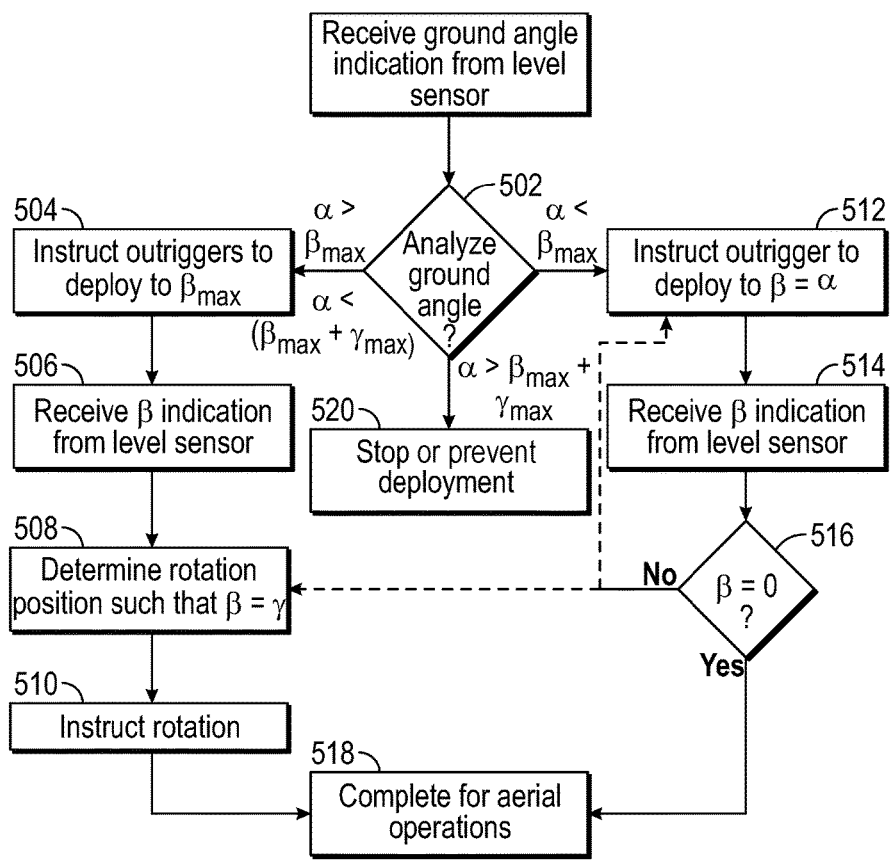
Figure 6:
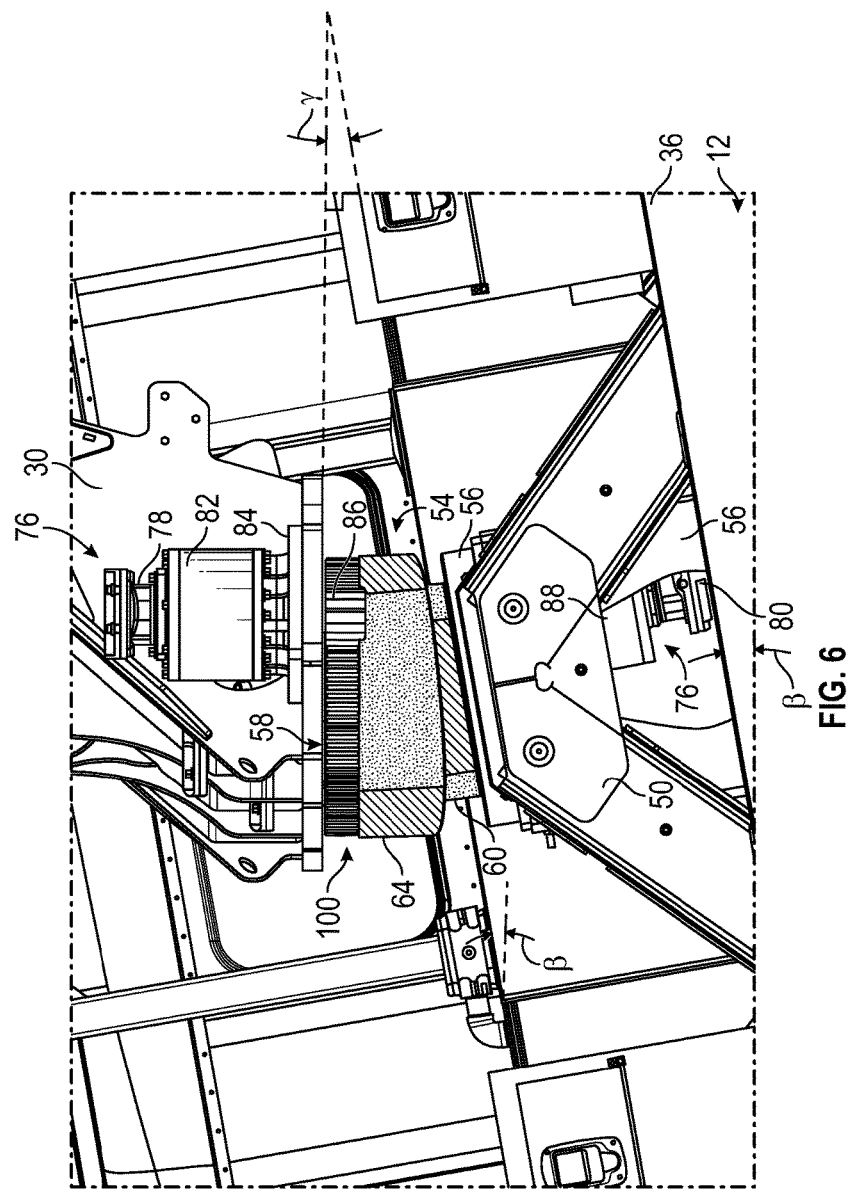
Figure 7:
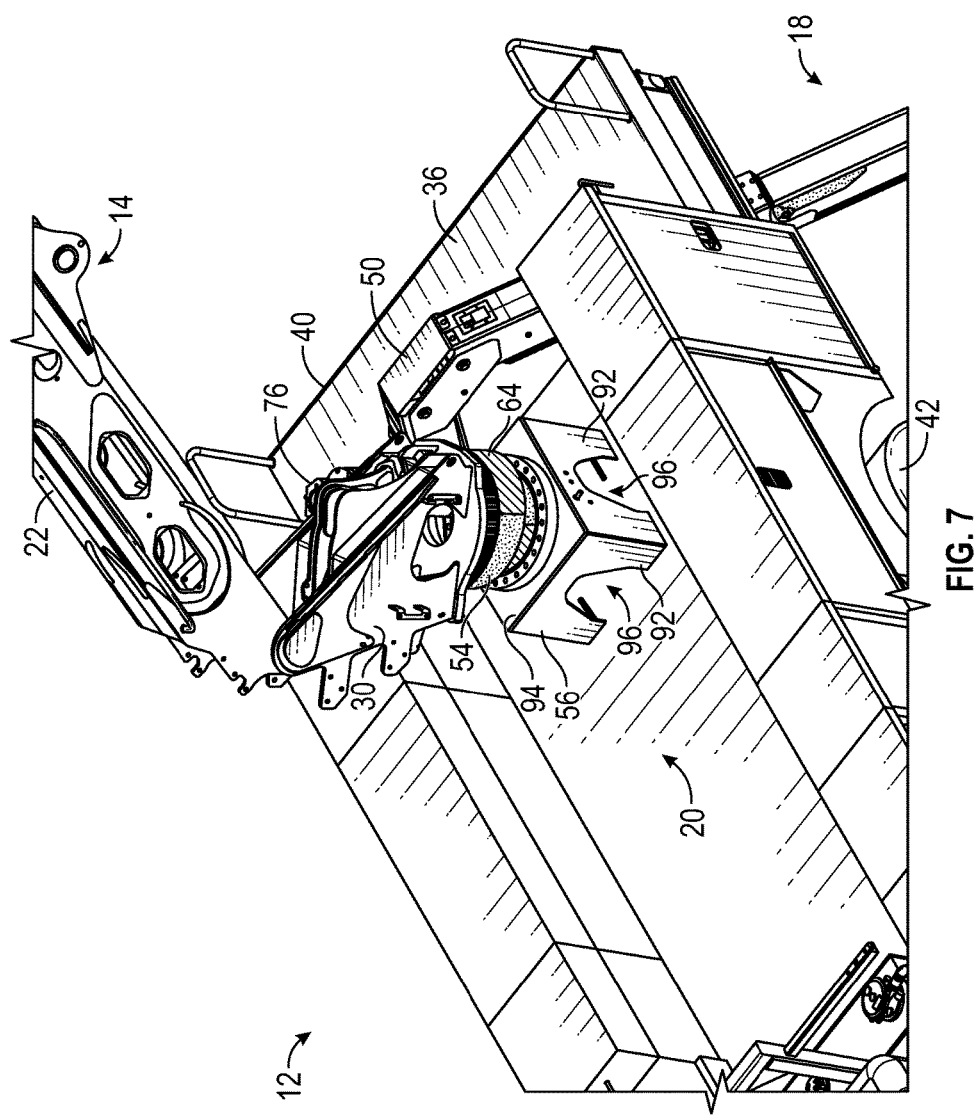
Figure 8:
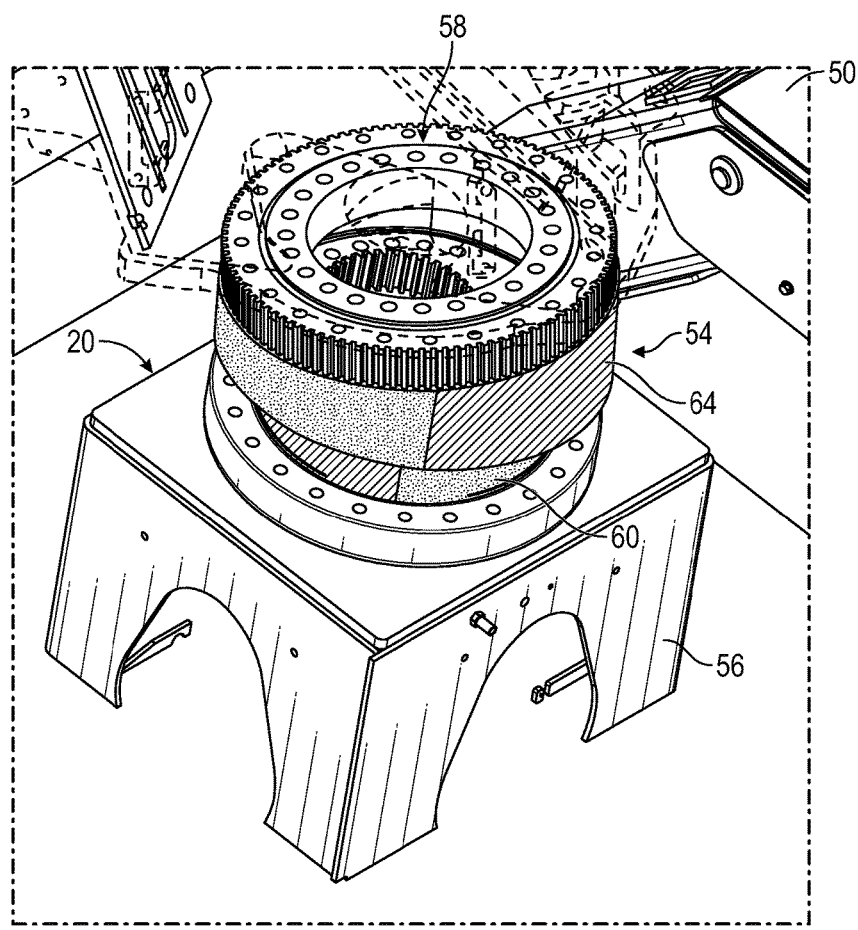
Figure 9A:
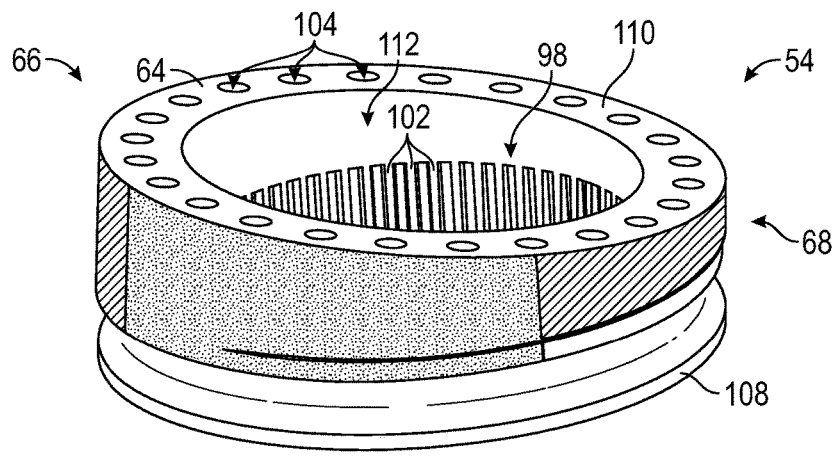
Figure 9B:
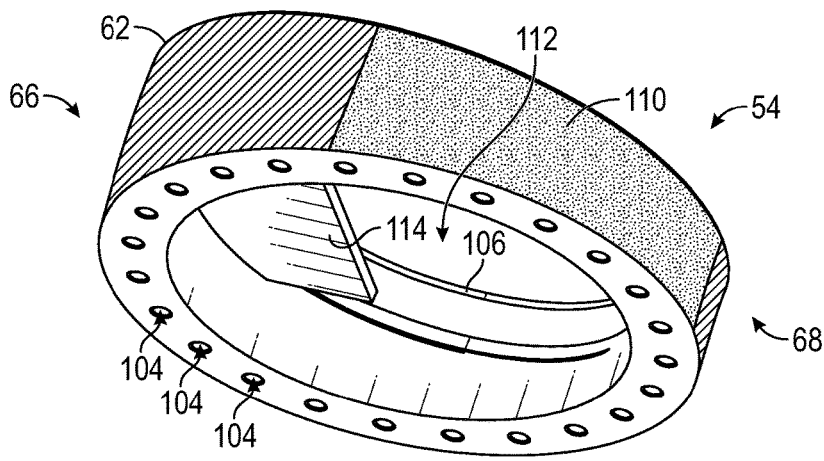
Figure 9C:
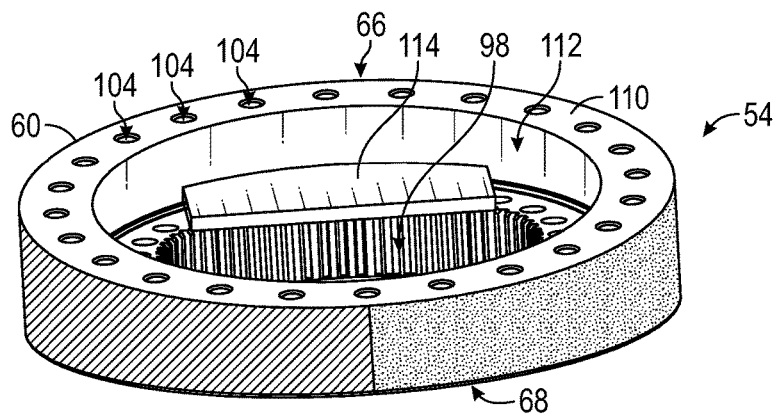

FIGS. 3A-3C each show a simplified diagram of the aerial device from a rear view, showing exemplary angles relative to downward;

FIGS. 4A-4C each show a simplified diagram of a turntable leveling system configured to provide additional leveling;

FIG. 5 is a flow diagram of exemplary steps performed by a controller in leveling the system;

FIG. 6 is a zoomed-in rear view of the aerial device shown in FIG. 2, so as to emphasize the turntable leveling system;

FIG. 7 is a zoomed-in perspective view of the aerial device in FIG. 1, so as to emphasis the turntable leveling system;

FIG. 8 is a further zoomed-in perspective view of the turntable leveling system of FIG. 7, with a boom turret and boom assembly removed; and FIGS. 9A-9C each show a perspective view of the respective components of the turntable leveling system.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

A utility vehicle 10 constructed in accordance with various embodiments of the invention, is shown in FIG. 1. The utility vehicle 10 generally comprises a base 12 with a boom assembly 14 rotatably mounted thereto. An implement 16 (such as a winch hook, a digger derrick, a pole guide, a utility platform, or other tool) is disposed on the boom assembly 14 to provide for the accomplishment of a task by a utility worker. The base 12 is stabilized and may be at least partially leveled by a set of outriggers 18. Further leveling is performed by a turntable leveling system 20 that is secured to the base 12.

Before discussing the turntable leveling system 20 in detail, the other components of the utility vehicle 10 will be discussed so as to orient the reader as to a particular exemplary embodiment of the invention. It should also be appreciated that some embodiments of the invention are configured to be used on or with other devices. The boom assembly 14 broadly comprises a lower boom section 22 and at least one upper boom section 24. The boom assembly 14 presents a proximal end 26 and a distal end 28. The proximal end 26 is rotatably and/or pivotably secured to a boom turret 30 of the base 12. The distal end 28 is rotatably and/or pivotably secured to the implement 16, such as a utility platform 32, illustrated in FIGS. 1 and 2, configured for supporting a utility worker therein.

A mobile operations cab 34 is utilized to drive or otherwise move the base 12 relative to the ground. The base 12 may also include a static operations cab (not illustrated) specifically for operating the boom assembly while static. The proximal end 26 of the boom assembly 14 may further comprise a winch (not illustrated) that is associated with a load line (not illustrated).

The base 12 of the utility vehicle 10 is a selectively stabilized platform. In embodiments of the invention, the base 12 is an aerial device base, a crane base, an oilrig, an earth-working machine, an automobile, or a fixed structure.

The base 12 provides stability and a counterweight to a load being supported by the boom assembly 14. The base 12 includes a chassis 36, which presents a deck 38 at a deck level (the angle of which is discussed below). The base 12 may also include one or more bumpers 40. The chassis 36 of the utility vehicle 10 is typically mobile and moves via wheels 42 or tracks rotatably secured to the base 12 below deck level.

The base 12 of the utility vehicle 10 utilizes at least one outrigger 18 for stabilization. In embodiments of the invention, such as illustrated in FIGS. 1-2, the outriggers 18 deploy from within, below, or alongside the base 12. The outriggers 18 are configured to be selectively placed into a stowed position (not illustrated) and a deployed position (as shown in FIGS. 1-2). When the outriggers 18 are in the stowed position, the utility vehicle 10 is free to maneuver via the wheels 42 or tracks because the outriggers 18 are not in contact with the ground. When the outriggers 18 are in the deployed position, the utility vehicle 10 is prevented from maneuvering because the outriggers 18 are in contact with the ground. In some embodiments, the outriggers 18 lift the wheel 42 and/or track at least a portion off of the ground. This further prevents movement of the utility vehicle 10 and provides a more stable platform for the task to be performed.

In embodiments of the invention, the base 12 includes a plurality of outriggers 18, such as two, three, four, five, six, eight, etc. FIGS. 1-2 illustrated an exemplary base 12 with four outriggers 18, a front-left outrigger, a front-right outrigger, a rear-left outrigger, and a rear-right outrigger (not all are clearly illustrated in the figures). In embodiments of the invention, the outriggers 18 are deployed from the base 12 in a shape (when viewed from above) that is substantially X-shaped, H-shaped, T-shaped, I-shaped, or other configuration. Relative to a forward driving direction, the outriggers 18 may deploy forward and backward, to the sides (as illustrated), at some intermediate angle therebetween (such as degrees, 45 degrees, 60 degrees relative to the forward/backward direction), etc.

One consideration during the determination of the layout of outriggers 18 relative to the base 12 is the size, shape, and weight distribution of the base 12. The layout of outrigger mounting is determined by the maximum overturning moment of the boom. The moment generated by the weight of the chassis applied at some distance from the chassis center of gravity to the outrigger tipping line resists the overturning moment. Therefore, the overturning moment and the chassis weight and center of gravity must be understood before selecting outrigger location. For example, if the base 12 is relatively long in the forward direction and relatively thin in the sideways direction, the outriggers 18 may deploy substantially perpendicular to the forward direction (i.e. the sideways direction). This is because the likelihood of the base 12 tipping forward or backward is reduced. A wide base 12 can therefore be achieved via a perpendicular deployment. The perpendicular deployment, as illustrated, may also allow for some leveling to be performed by the outriggers 18. As another example, if the base 12 is not substantially longer in the forward direction than in the sideways direction, the outriggers 18 may deploy in a diagonal direction relative to the forward direction, in a substantial X-shape when viewed from above. This is because the likelihood of the base 12 tipping forward or backward has not been reduced by the shape of the base 12.

The outrigger 18 will now be discussed in more detail, as best illustrated in FIG. 1. In embodiments of the invention the outrigger 18 is configured to be installed on and deployed by the utility vehicle 10. In some embodiments, the outriggers 18 are configured to be added to an existing utility vehicle 10. The outrigger 18 comprises an actuator 44, an outrigger leg 46, an outrigger foot 48, and an outrigger base 50. The outrigger 18 is configured to be disposed into either a stowed position and a deployed position. The outrigger 18 is moved between the stowed position and the deployed position by the actuator 44. In some embodiments, the actuator 44 may operate in response to direct command from the operator, which may instruct or otherwise cause the actuator 44 to elongate or shorten. In other embodiments, the actuator 44 may operate in response to a certain mode or action being selected by the operator (such as preparing to move the boom assembly 14 or preparing to move the utility vehicle 10).

The actuator 44 is secured to the outrigger leg 46, the outrigger foot 48, and/or the outrigger base 50. The actuator 44 is configured to selectively place the outrigger 18 into the stowed configuration and the deployed configuration. Typically, the actuator 44 will shorten to place the outrigger 18 into the stowed configuration and elongate to place the outrigger 18 into the deployed configuration. The actuator 44 pushes and pulls against the outrigger leg 46 relative to the outrigger base 50 and/or the outrigger foot 48 relative to the outrigger leg 46.

In embodiments of the invention, the actuator 44 is a hydraulic cylinder. The hydraulic cylinder comprises a rod disposed at least partially within a barrel, not illustrated. The rod includes a piston (not illustrated) fully disposed within the barrel. A void (not illustrated) is formed between the piston and the barrel and a cap on the interior side. The hydraulic cylinder is elongated by pumping hydraulic fluid into the void so as to enlarge the void (and by extension push the rod and piston relative to the barrel). The pumping is performed by a pump via hydraulic lines. In other embodiments, the actuator 44 is a pneumatic cylinder, which uses air or another gas in lieu of the hydraulic fluid. In still other embodiments, the actuator 44 is an electric motor or other type of motor.

The outrigger base 50 is configured to be secured to the chassis 36 of the utility vehicle 10. In some embodiments, the outrigger base 50 is originally manufactured as a component of the chassis 36. In other embodiments, the outrigger base 50 is configured to be added to an existing chassis 36, such as upon an existing deck 38.

In embodiments of the invention, the various components of the outrigger 18 are formed of a metal to provide structural stability and strength. In other embodiments of the invention, the various components of the outrigger 18 are formed of a hardened polymer to provide dielectric qualities to prevent the unintended discharge of electricity through the outrigger 18. In still other embodiments of the invention, some components of the outrigger 18 are formed of metal and other components of the outrigger 18 are formed of a hardened polymer.

As best illustrated in FIG. 2, the outriggers 18 of embodiments of the invention may provide at least some leveling of the chassis 36. Outrigger leveling is accomplished by extending outriggers 18 on a downhill side (e.g., toward the left on FIG. 2) longer than outriggers 18 on an uphill side (e.g., toward the right of FIG. 2). In some instances, this outrigger leveling may be sufficient to fully level the chassis. In these instances, the turntable leveling system 20 may not be utilized or may be partially utilized.

FIG. 2 shows the utility vehicle 10 from a rear view. As can be seen, the utility vehicle 10 is disposed on non-level ground. To compensate for the non-level ground, leveling is performed by the outriggers 18 and the turntable leveling system 20. In some instances, the outriggers 18 alone may be sufficient to overcome the non-level ground and provide a level basis for the boom turret 30. In other instances, the turntable leveling system 20 alone may be sufficient to overcome the non-level ground and provide a level basis for the boom turret 30. In still other instances, a combination of the outrigger system and the turntable leveling system 20 may be utilized, or one system preferred over the other. For example, the outrigger system may be utilized alone if sufficient to level the boom turret 30 such that the entire chassis 36 will also be level. The outrigger system may be preferred to maximize the stability potential of the chassis 36.

Three angles are shown in FIG. 2 and will be discussed herein. These angles are the ground angle ($\alpha$), the chassis angle ($\beta$), and the turntable angle ($\gamma$). Each of the three angles is measured relative to a true horizontal direction, as shown in FIG. 2 by the three respective true horizontal lines (being at a right angle to the true downward direction, as shown). These angles are exemplary and used to provide clarity to the reader as to the functions being performed by the various components. These angles may also be measured by a level sensor 52 (shown schematically in FIGS. 3A-3C), calculated and instructed by a processor, or the like (as discussed in more depth below). As discussed in depth below, one exemplary purpose of the invention is to compensate for the ground angle ($\alpha$) through the chassis angle ($\beta$), the turntable angle ($\gamma$), or a combination thereof, such that the boom turret 30 is level relative to the true horizontal direction. The boom turret 30 being level allows for boom operations to occur despite the non-level ground.

The ground angle ($\alpha$) is the angle of the ground relative to a true horizontal direction. As shown in FIG. 3A, the ground angle ($\alpha$) may be determined by a level sensor 52 on the chassis 36 prior to deployment of the outriggers 18. It should be appreciated that the ground angle ($\alpha$) is shown as a straight line, however in many instances the ground will not be straight. In these instances, the ground angle ($\alpha$) may be considered an average angle relative to a true horizontal direction, or the angle of the chassis 36 thereon (before deployment of the outriggers 18). In some embodiments, the ground angle ($\alpha$) may be considered as an imaginary line between the ground upon which two respective outrigger feet 48 are emplaced (irrespective of how the chassis 36 is oriented relative to those outrigger feet 48).

It should also be appreciated that the ground angle ($\alpha$) is shown from the rear view in FIG. 2. It is standard practice in the industry for an operator to park the utility vehicle 10 such that a slope of the ground is perpendicular to the direction of the utility vehicle 10. This allows the outriggers 18 to provide at least some level correction. However, it should be appreciated that the ground angle ($\alpha$) may be at any angle relative to the chassis 36 and may include front-rear and left-right components (relative to the chassis 36). As such, the turntable leveling may provide leveling in a front-rear direction as well as a left-right direction, although the left-right direction will be mainly discussed herein.

The chassis angle ($\beta$) is the angle of the chassis 36 relative to the true horizontal direction after deploying of the outriggers 18. As can be seen, the outriggers 18 are deployed such that a first outrigger on a downhill side is elongated further than a second outrigger on an uphill side. This corrects at least a portion of the ground angle ($\alpha$). As such, in most instances the chassis angle ($\beta$) will be less than the ground angle ($\alpha$).

In embodiments of the invention, the utility vehicle 10 may have a maximum chassis angle ($\beta_{max}$) (not illustrated), which is the maximum amount of change which the outriggers 18 are capable of changing the angle of the chassis 36 relative to the ground. If $\beta_{max} \geq \alpha$, the correction by the outriggers 18 may be sufficient to fully level the boom turret 30. If $\alpha > \beta_{max}$, the correction by the outriggers 18 will not be sufficient to fully level the boom turret 30. In these instances, the turntable leveling system 20 may be used to further level the boom turret 30. It should be appreciated, however, that in most instances $\beta_{max}$ is an approximation based upon the structure of the outriggers 18, because the actual amount of outrigger correction will depend on various field conditions, such as the angle of the ground relative to each respective outrigger foot 48, the conditions of the ground (such as how hard, soft, or wet the ground is), and other factors.

The turntable angle ($\gamma$) is the angle achieved by the turntable leveling system 20 relative to the chassis 36 of the utility vehicle 10, as shown in FIG. 2. More specifically, and as discussed below, the turntable angle ($\gamma$) is achieved by the rotation of at least one turntable wedge 54 above a turntable mount 56 of the turntable leveling system 20. The turntable leveling system 20 changes the angle of a top portion 58 relative to the chassis 36 by rotating one or more turntable wedges 54 (as discussed in much more depth below). The turntable angle ($\gamma$) is a measure of the amount to which the correction by the turntable leveling system 20 is made. In order to level the boom turret 30, in embodiments of the invention the turntable angle ($\gamma$) will be set to the chassis angle ($\beta$) up to a maximum turntable angle ($\gamma_{max}$) as shown in FIG. 4A and discussed below. If the chassis angle ($\beta$) is more than the maximum turntable angle ($\gamma_{max}$), the boom turret 30 cannot be adequately leveled in that situation. As such, the operator may need to move the utility vehicle 10, manipulate the ground to provide a more level ground angle ($\alpha$), take other remedial steps, or refrain from utilizing the boom assembly 14.

Turning to FIGS. 3A-3C, the measuring and determining of the three respective angles will be discussed. Whereas FIG. 2 illustrates exemplary angles in the static configuration, FIGS. 3A-3C show how those angles are measured during deployment, as discussed below. FIGS. 3A-3C each show a simplified diagram of the utility vehicle 10 moving from an unlevel base in FIG. 3A to a level base in FIG. 3C. Thus the boom turret 30 (not illustrated in these figures) will be level so as to allow for boom assembly 14 (not illustrated in these figures) usage.

FIG. 3A depicts the utility vehicle 10 upon initial stop in a certain location. A level sensor 52 is secured to the chassis 36 and provides a first sensor reading. The sensor reading is indicative of the amount to which the chassis 36 is away from a true downward direction. The level sensor 52 is illustrated centered on the chassis 36, but this is just for clarity. In embodiments of the invention, the level sensor 52 may be disposed anywhere on the chassis 36. It should be appreciated that the ground angle ($\alpha$) is shown relative to a horizontal direction and a vertical direction in FIG. 3A. These ground angles ($\alpha$) each have the same magnitude because they are relative to a horizontal and vertical directions respectively. Thus, the level sensor 52 will determine the ground angle relative to straight down, and this reading will be the same magnitude as the angle away from true level.

The level sensor 52 is configured to determine a magnitude and/or direction of tipping of the level sensor 52 relative to straight down, an artificial horizon, or other constant. The level sensor 52 is secured (directly or indirectly) to the chassis 36 of the base 12. As such, a tipping of the chassis 36 relative to straight down can be determined and measured by the level sensor 52. The level sensor 52 may be an ultrasonic level sensor, accelerometer, inclinometer, other MEMS style devices, an optical single-point level sensor, a float switch, a capacitive level sensor, a radar level sensor, and/or a conductivity or resistance level sensor.

FIG. 3B depicts the utility vehicle 10 from FIG. 3A with the outriggers 18 deployed. After the deployment, the level sensor 52 takes a second sensor reading. The second sensor reading is indicative of the amount to which the chassis 36 is away from the true downward direction with the outriggers 18 emplaced. As can be seen, the chassis angle ($\beta$) is smaller in magnitude than the ground angle ($\alpha$) that was previously measured (both relative to the true horizontal and vertical directions).

FIG. 3C depicts the utility vehicle 10 of FIG. 3B with the turntable leveling system 20 utilized and setting the turntable angle ($\gamma$) to be equal in magnitude to the measured chassis angle ($\beta$). Thus, as illustrated, the top portion 58 of the turntable leveling system 20 is parallel to the true horizontal direction (e.g., as each are shown perpendicular to the true downward direction). It should be noted that the level sensor 52 is still measuring the chassis angle ($\beta$) because the level sensor 52 is below the turntable leveling system 20. Thus, the angle of the top portion 58 is determined based upon the calculated and implemented turntable angle ($\gamma$). In some other embodiments, a second level sensor 52 is disposed on or above the turntable leveling system 20 to confirm level. In other embodiments, the level sensor 52 may be above or associated with the turntable leveling system 20, the boom turret 30, or other component of the boom assembly 14. As such, the level sensor 52 may detect full level directly.

The turntable leveling system 20 will now be discussed in more detail. A simplified diagram of a turntable leveling system 20 is shown in FIGS. 4A-4C. As briefly discussed above, the turntable leveling system 20 comprises a plurality of turntable wedges 54 and the turntable mount 56. In embodiments of the invention, the turntable leveling system 20 may include two turntable wedges 54, three turntable wedges 54 (as illustrated in FIGS. 4A-4C), more or fewer turntable wedges 54. In the embodiment shown, the turntable leveling system 20 includes a lower turntable wedge 60, a central turntable wedge 62, and an upper turntable wedge 64. Each of the lower turntable wedge 60, the central turntable wedge 62, and the upper turntable wedge 64 is independently rotatable relative to the chassis 36. The lower turntable wedge 60 is rotatably secured to the turntable mount 56.

Further, each of the lower turntable wedge 60, the central turntable wedge 62, and the upper turntable wedge 64 presents a tall side 66 opposite a short side 68 (shown in FIGS. 4A and 9A-C). In FIGS. 4A-4C, the short side 68 is illustrated as shaded, and the tall side 66 is illustrated as unshaded. This allows the reader to observe the orientation of the respective turntable wedges 54 relative to one another. It should be noted that in embodiments of the invention, the turntable wedges 54 are not actually so shaded. FIGS. 4A-4C thus each show the respective turntable wedges 54 54 disposed at various independently rotated orientations. However, in some embodiments, the turntable wedges 54 may be actually shaded such that the user, or other observe, can see the orientation of at least one turntable wedge 54.

The turntable leveling system 20 is configured to change the level of the top portion 58 (to which a boom turret 30 or other component of the boom assembly 14 is secured, not illustrated in these Figs.) up to a maximum turntable angle ($\gamma_{max}$). The maximum turntable angle ($\gamma_{max}$) is shown in FIG. 4A. In this configuration, the three short sides 68 are aligned and the three tall sides 66 are aligned. The allows for the maximum turntable angle ($\gamma_{max}$) to be achieved. It should be noted, as discussed above, that the turntable angle ($\gamma$) is measured relative to the chassis angle ($\beta$) as shown in FIG. 4A.

Turning to FIG. 4B, a turntable angle ($\gamma$) of zero is shown. In this orientation, the top portion of the turntable leveling system 20 is parallel to the turntable mount 56 and to the chassis 36. This may be a default orientation of the turntable leveling system 20, such that no leveling correction is applied.

Turning to FIG. 4C, the turntable angle ($\gamma$) is set to be equal and opposite of the chassis angle ($\beta$). As such, the top portion of the turntable leveling system 20 is parallel to the true horizontal direction, as also illustrated in FIG. 3C. The below discussed computerized method steps may be implemented to achieve this result. Further, the structures discussed herein may be configured so as to allow for rotation of the turntable leveling system 20 so as to achieve this result.

In embodiments of the invention, the turntable leveling system 20 comprises a computing device 70. In other embodiments of the invention, the turntable leveling system 20 is associated with a computing device 70 of the utility vehicle 10. The turntable leveling system 20 of embodiments of the invention may comprise computing devices 70 to facilitate the functions and features described herein. The computing devices 70 may comprise any number and combination of processors, controllers, integrated circuits, programmable logic devices, or other data and signal processing devices for carrying out the functions described herein (which may be referred to as a processing element 72, illustrated in FIG. 1), and may additionally comprise one or more memory storage devices, transmitters, receivers, displays (which may be referred to as a memory element 74, illustrated in FIG. 1), and/or communication busses for communicating with the various devices of the utility vehicle 10.

The processing element 72 may implement operating systems, and may be capable of executing the computer program, which is also generally known as instructions, commands, software code, executables, applications ("apps"), and the like. The processing element 72 may include processors, microprocessors, microcontrollers, field programmable gate arrays, and the like, or combinations thereof. The memory element 74 may be capable of storing or retaining the computer program and may also store data, typically binary data, including text, databases, graphics, audio, video, combinations thereof, and the like. The memory element 74 may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. Thus, the memory element 74 may be a non-transitory computer readable storage medium.

An exemplary method that may be performed by the processing element 72, based upon instruction from a computer program stored on the non-transitory computer readable storage medium, such as the memory element 74, is shown in FIG. 5. In Step 500, the processing element 72 receives a ground angle indication from the level sensor 52. In some embodiments, the ground angle indication is received in response to a specific request from the processing element 72. For example, upon a parking brake being emplaced, the ground angle indication may be requested. In other embodiments, the ground angle indication may be sent periodically absent a request.

In Step 502, the processing element 72 analyzes the ground angle ($\alpha$) as indicated by the ground angle indication. If the ground angle ($\alpha$) is less than the maximum chassis angle ($\beta_{max}$), the processing element 72 may instruct the leveling of the chassis 36 using only the outriggers 18 (or a combination of the outriggers 18 and turntable leveling system 20), as discussed below in Step 512. If the ground angle ($\alpha$) is greater than the sum of the maximum chassis angle ($\beta_{max}$) and the maximum turntable angle ($\gamma_{max}$), the processing element 72 may prevent deployment in that position, as discussed below in Step 520. If the ground angle ($\alpha$) is greater than the maximum chassis angle ($\beta_{max}$) but less than the sum of the maximum chassis angle ($\beta_{max}$) and the maximum turntable angle ($\gamma_{max}$), the processing element 72 may use both the outrigger system and the turntable leveling system 20, as discussed below.

In Step 504, upon determining that the ground angle ($\alpha$) is greater than the maximum chassis angle ($\beta_{max}$) but less than the sum of the maximum chassis angle ($\beta_{max}$) and the maximum turntable angle ($\gamma_{max}$), the processing element 72 instructs the outrigger system to deploy. Based upon the detected ground angle ($\alpha$), the outriggers 18 will deploy with the outriggers 18 on the downhill side elongating more than those on the uphill side (as illustrated in FIG. 2. The amount to which the downhill outrigger deploys more than the uphill outrigger may be determined by the processing element 72 or may be standard (such as at the maximum chassis angle ($\beta_{max}$).

In Step 506, after the outriggers 18 are deployed, the processing element 72 receives a chassis angle indication from the level sensor 52. The chassis angle indication may be sent automatically upon the outriggers 18 fully deploying or upon a request from the processing element 72.

In Step 508, the processing element 72 determines the rotation position for each turntable wedge 54 that will set the turntable angle ($\gamma$) to the measured chassis angle ($\beta$), as indicated by the chassis angle indication from the level sensor 52. This can include a determination of a lower turntable wedge 60 orientation, a central turntable wedge 62 orientation, and an upper turntable wedge 64 orientation. Each such orientation may be relative to a default orientation for that turntable wedge 54, respective to a standard direction, respective to the current location of that turntable wedge 54, or other reference frame.

In Step 510, the processing element 72 instructs rotation of each respective turntable wedge 54 to the respective orientations. A turntable motor 76 (shown in FIG. 6 and discussed below) or motors then rotates each turntable wedge 54 to the instructed orientation. Each turntable motor 76 may run for a specified length of time, run for a specified angular change, run for a specified change in orientation of the turntable wedge 54, moves until a certain location is achieved, or performs other functions as instructed by the processing element 72.

In Step 512, upon the analysis in Step 502 finding the ground angle ($\alpha$) is less than the maximum chassis angle ($\beta_{max}$), the processing element 72 may instruct the leveling of the chassis 36 using only the outriggers 18 (or a combination of the outriggers 18 and turntable leveling system 20). In Step 512, the processing element 72 instructs the outriggers 18 to deploy so as to set the chassis angle ($\beta$) equal and opposite to the ground angle ($\alpha$), so as to cancel the ground angle. This may include a determination by the processor of an extent to which the downhill outrigger will elongate more than the uphill outrigger. In Step 514, the processing element 72 receives a chassis angle indication from the level sensor 52.

In Step 516, the processing element 72 analyzes the chassis angle (β) as indicated by the chassis angle indication from the level sensor 52. If the chassis angle (β) is zero or within a certain threshold of zero, the chassis 36 has been leveled relative to the true horizontal. If the chassis angle (β) is not within the threshold of zero, further leveling is needed for boom assembly operations. The processing element 72 may then instruct the outrigger deployment to change so as to account for the new chassis angle (β), or may instruct the turntable leveling system 20 to finish the leveling (such as by moving to Step 508). The processing element 72 may also check for accuracy in the operation and leveling of the turntable leveling system.

In Step 518, upon a determination that level has been achieved (either through the outrigger system, the turntable leveling system 20, or both), the processing element 72 is complete for boom operations. The processing element 72 may deploy the boom assembly 14, rotate the boom turret 30, or perform other actions as instructed by the user or a computer program. If, on the other hand, level could not be achieved (either at the analysis at Step 502 or in subsequent operation), in Step 520, the processing element 72 rejects or prevents deployment of the boom assembly 14. In this situation, the user may need to move the utility vehicle 10 to a more level location, physically manipulate the ground to be more level (such as by digging down on the uphill side, building up on the downhill side, leveling the contact point, providing a more solid surface, or other practice like cribbing), or decline to perform the boom operations.

The hardware components that allow for the above-discussed and other similar processes to be performed will now be discussed in more detail. Turning to FIG. 6, an embodiment of the invention is shown, in which the turntable leveling system 20 includes two turntable wedges 54 and a rotation bearing. FIG. 6 shows a zoomed-in rear view of the utility vehicle 10 from FIG. 2. The broken exterior lines around FIG. 6 illustrate the true horizontal and true downward directions. As can be seen toward the lower end of FIG. 6, the chassis 36 is disposed relative to the true horizontal direction by a chassis angle (β), as can also be seen in FIG. 2. As can also be seen, the boom turret 30 is level with respect to the true horizontal direction by the displacement of the turntable leveling system 20 at the turntable angle (γ) (being equal in magnitude and opposite to the chassis angle (β)).

As best illustrated in FIG. 6, the turntable leveling system 20 further comprises at least one turntable motor 76. In some embodiments of the invention, the turntable leveling system 20 comprises an upper turntable motor 78 and a lower turntable motor 80. Each respective turntable motor 76 turns one or more of the turntable wedges 54, so as to orient the respective turntable wedges 54 in an orientation as directed by the processing element 72. The upper turntable motor 78 may additionally or alternatively rotate the boom turret 30 relative to the chassis 36. As such, a combination of rotations of the turntable wedges 54 and the boom turret 30 orients and levels the boom assembly 14.

As illustrated in FIG. 6, the upper turntable motor 78 may include an upper gearbox 82, an upper motor mount 84, and an upper pinion 86. The upper gearbox 82 varies the rotation of the upper pinion 86 from the motor speed. This may be a fixed ratio or a variable ratio. The upper motor mount 84 is secured to the boom turret 30, the turntable leveling system 20, or other structure. The upper pinion 86 traverses through an opening (not illustrated) in the boom turret 30 and/or the turntable leveling system 20 so as to interface with a circular or arcuate rack 88 of the upper turntable wedge 64. This circular or arcuate rack 88 may also be a rotation bearing that rotates the boom turret 30 relative to the chassis 36. The upper pinion 86 rotates under a rotational force from the upper motor (as translated by the upper gearbox 82), so as to induce a movement along the circular or arcuate rack 88 of the upper turntable wedge 64.

The lower turntable motor 80 is disposed at least partially below the lower turntable wedge 60. As illustrated in FIG. 6, the lower turntable motor 80 may include a lower gearbox 90, a lower motor mount (not illustrated), and a lower pinion (not illustrated). The lower gearbox 90 varies the rotation of the lower pinion from the motor speed. This may be a fixed ratio or a variable ratio. The lower motor mount is secured to the turntable mount 56, the turntable leveling system 20, or other structure. The lower pinion traverses through an opening (not illustrated) in the turntable mount 56 so as to interface with a circular or arcuate rack 88 of the lower turntable wedge 60 (as illustrated in FIGS. 8, 9A, and 9C). The lower pinion rotates under a rotational force from the lower motor (as translated by the lower gearbox 90), so as to induce a movement along the circular or arcuate rack 88 of the lower turntable wedge 60.

The embodiment shown in FIG. 6 comprises the upper turntable wedge 64 and the lower turntable wedge 60. In other embodiments of the invention, the central turntable wedge 62 may be moved by the upper turntable motor 78, the lower turntable motor 80, a secondary upper motor, a secondary lower motor, or other motor. In still other embodiments, the lower pinion may be utilized to move both the lower turntable wedge 60 and the central turntable wedge 62. In these embodiments, the lower pinion may have an independently turning segment for turning the central turntable wedge 62.

It should be appreciated that, as used herein, a "motor" can be any device that moves one object relative to another. For example, the motor may be an electric motor, a hydraulic motor, a hydraulic cylinder or linkage, a rack and pinion, a rotary actuator such as a HELAC, a screw drive (which may be powered electrically or hydraulically), or other motor device.

Turning to FIG. 7, a zoomed-in view of the utility vehicle 10 of FIG. 1 is shown, specifically showing the turntable mount 56 and the turntable leveling system 20. The turntable mount 56 is secured to and protrudes upwardly from the deck 38 of the chassis 36. The turntable mount 56 extends upward to provide a higher base for the boom turret 30, to prevent the boom assembly 14 from striking tool boxes and other structures on the utility vehicle 10, to provide space for the lower turntable motor 80, or for other reasons. In embodiments of the invention, the turntable mount 56 presents a rectangular prism shape, such as shown in FIG. 7. The turntable mount 56 may therefore include a plurality of side plates 92 and a top plate 94.

One exemplary embodiment of the turntable mount 56 is shown in FIG. 7. IN this embodiment, In this embodiment, at least one side plate 92 may include an opening 96 or recess therein. The opening 96 is disposed in the side plate 92 so as to allow access to the interior of the turntable mount 56. For example, this may allow the lower turntable motor 80 to be installed and/or repaired. The opening 96, as shown in FIG. 7 is an arcuate opening extending from the chassis 36 upward. The top plate 94 is secured (e.g., by welding) to each of the side plates 92. The top plate 94 is level with the deck 38 of the chassis 36, such that when the utility vehicle 10 is parked on level ground, the chassis 36 and the top plate 94 are both level.

FIG. 8 shows the embodiment of FIG. 7 further zoomed-in with the boom turret 30 and the boom assembly 14 removed. Thus, the top portion 58 of the turntable leveling system 20 can be seen. The top portion 58 of the turntable leveling system 20 defines the turntable angle (γ) relative to the chassis 36 (as shown by the top plate 94 of the turntable mount 56). Thus, the independent rotations of the various turntable wedges 54, changes the angle of the top portion 58 relative to the top plate 94.

As can be seen in FIGS. 8 and 9A-9C, the turntable wedges 54 are substantially annular shaped. As discussed above, each turntable wedge 54 includes the tall side 66 and the short side 68. Each turntable wedge 54 may additionally present an arcuate or circular rack 88, such as an interior circular rack 98 or an exterior circular rack 100 (such as illustrated in FIG. 6). The interior circular rack 98 is disposed on an interior side of the annular shape, such a set of protrusions 102 of the circular rack 88 protrude inwardly from the annular shape (or a set of recesses protrude within the annular shape). The exterior circular rack 100 is disposed on an exterior side of the annular shape, such that a set of protrusions 102 of the circular rack 88 protrude outwardly from the annular shape. The circular racks 88 interface with one of more pinions of the respective motors 78,80 to move the respective turntable wedges 54 relative to one another.

In embodiments of the invention, a series of bearings 104 is disposed between any two respective turntable wedges 54. Each bearing is disposed within or otherwise associated with a bearing recess in the respective turntable wedge 54. The bearing facilitates low-friction rotation of the respective turntable wedges 54 relative to one another. This allows for the turntable wedges 54 to rotate relative to the other respective turntable wedge 54, the turntable mount 56, and/or the boom turret 30. By allowing this free rotation, the bearings 104 allow for the turntable angle (γ) to be achieved. The bearing 104 may be a ball bearing (such as a deep groove ball bearing, a self-aligning ball bearing, an angular contact ball bearing, or a thrust ball bearing), a roller bearing (such as a spherical roller bearing, a cylindrical roller bearing, a tapered roller bearing, or a needle roller bearing), plain bearings, fluid bearings, magnetic bearings, or other types of bearings.

In embodiments of the invention, the respective turntable wedges 54 fit together so as to provide a stable platform for the boom turret 30. The respective turntable wedges 54 are thus rotatably secured to the other respective turntable wedges 54, the turntable mount 56, and/or the boom turret 30. One or more of the turntable wedges 54 may present an outward annular protrusion 106 (as illustrated in FIG. 9B) and/or an inward annular protrusion 108 (as illustrated in FIG. 9A). The outward annular protrusion 106 is complementary to the inward annular protrusion 108 such that the outward annular protrusion 106 fits together with the inward annular protrusion 108. The combination of the inward annular protrusion 108 and the outward annular protrusion 106 thus provide for secure rotatability of the turntable leveling system 20.

FIG. 9A shows an exemplary embodiment of an upper turntable wedge 64. The upper turntable wedge 64 presents an annular wedge shape including an outer wall 110 and a central opening 112. The upper turntable wedge 64 includes a series of bearings 104, an interior rack 98, and an outer annular protrusion 106. The upper turntable wedge 64 is configured to be disposed between the boom turret 30 on an upper side and the central turntable wedge 62 on a lower side. The outer wall 110 presents the tall side 66 and the short side 68, as discussed above.

FIG. 9B shows an exemplary embodiment of a central turntable wedge 62. The central turntable wedge 62 presents an annular wedge shape including an outer wall 110 and a central opening 112. The central turntable wedge 62 includes a series of bearings 104, an inner protrusion 114 configured to be rotated by at least one motor, and an inner annular protrusion 108. The central turntable wedge 62 is configured to be disposed between the upper turntable wedge 64 on an upper side and the lower turntable wedge 60 on a lower side. The inner annular protrusion 108 of the central turntable wedge 62 is configured to be fit within the outer annular protrusion 106 of the upper turntable wedge 64, as discussed above.

FIG. 9C shows an exemplary embodiment of a lower turntable wedge 60. The lower turntable wedge 60 presents an annular wedge shape including an outer wall 110 and a central opening 112. The upper turntable wedge 64 includes a series of bearings 104, an interior rack 98, an inner protrusion 114. The upper turntable wedge 64 is configured to be disposed between the central turntable wedge 62 on an upper side and the turntable mount 56 on a lower side.

As can be seen in FIGS. 9A-9C, various combinations of the above-discussed components may be used in the turntable leveling system 20. Other similar structures may also be utilized to facilitate rotation of the turntable leveling system 20 and securing the turntable leveling system 20 internally and externally, without exceeding the scope of the invention.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A utility vehicle comprising:
a chassis;
a boom turret rotatably secured to the chassis and configured to support a boom thereon; and
a turntable leveling system disposed between the chassis and the boom turret,
wherein the turntable leveling system is configured to level the boom turret relative to the chassis,
said turntable leveling system including a turntable wedge,
wherein the turntable leveling system levels the boom turret by changing an orientation of the turntable wedge relative to the chassis.

2. The utility vehicle of claim 1, further comprising:
a level sensor secured to the chassis,
wherein the level sensor is configured to determine a first level indication that is indicative of a ground angle.

3. The utility vehicle of claim 2, further comprising:
an outrigger system secured to the chassis,
wherein the outrigger system is configured to stabilize the chassis.

4. The utility vehicle of claim 3, wherein the outrigger system is configured to partially level the chassis by extending a first outrigger of a downhill side further than a second outrigger on an uphill side.

5. The utility vehicle of claim 4, wherein the level sensor is configured to determine a second level indication that is indicative of a chassis angle.

6. The utility vehicle of claim 5, further comprising:
a processor configured to perform steps—
determine, based upon the chassis angle, a turntable angle which will render the boom turret level, and
instructing the turntable leveling system to rotate the turntable wedge so as to dispose the boom turret at the turntable angle.

7. The utility vehicle of claim 6,
wherein the processor sets the turntable angle to be equal in magnitude and opposite to the chassis angle.

8. The utility vehicle of claim 1,
wherein the turntable wedge is a lower turntable wedge, further comprising:
an upper turntable wedge,
wherein each of the lower turntable wedge and the upper turntable wedge are independently rotatable relative to the chassis.

9. The utility vehicle of claim 1,
wherein the turntable wedge is annular shape,
wherein the turntable wedge presents a tall side opposite a short side.

10. A turntable leveling system configured to level a boom turret associated with a boom assembly, the system comprising:
a lower turntable wedge;
an upper turntable wedge,
wherein each of the lower turntable wedge and the upper turntable wedge is independently rotatable relative to the boom turret; and
a turntable motor configured to rotate at least one of the lower turntable wedge and the upper turntable wedge,
wherein rotation of at least one of the lower turntable wedge and the upper turntable wedge levels the boom turret.

11. The turntable leveling system of claim 10, further comprising
a central turntable wedge disposed between the upper turntable wedge and the lower turntable wedge,
wherein each of the lower turntable wedge, the central turntable wedge, and the upper turntable wedge is annular shape and presents a tall side opposite a short side.

12. The turntable leveling system of claim 10, further comprising:
a level sensor secured to a chassis,
wherein the level sensor is configured to determine a first level indication that is indicative of a ground angle.

13. The turntable leveling system of claim 12,
wherein the level sensor is configured to determine a second level indication that is indicative of a chassis angle,
wherein the chassis angle is determined following deployment of an outrigger system secured to the chassis,
wherein the outrigger system is configured to stabilize the chassis and partially level the chassis.

14. The turntable leveling system of claim 13, further comprising:
a processor configured to perform steps—
determine, based upon the chassis angle, a turntable angle which will render the boom turret level, and
instructing the turntable leveling system to rotate at least one of the lower turntable wedge and the upper turntable wedge so as to dispose the boom turret at the turntable angle.

15. The turntable leveling system of claim 14,
wherein the processor is further configured to determine a rotation position set which will render the boom turret at the turntable angle,
wherein the rotation position set includes a first orientation of the lower turntable wedge,
wherein the rotation position set includes a second orientation of the upper turntable wedge.

16. The turntable leveling system of claim 14,
wherein the processor is further configured to set the turntable angle to be equal in magnitude and opposite to the chassis angle,
wherein the turntable angle cancels the chassis angle so as to render a top portion of the turntable leveling system level with a true horizontal direction.

17. A computerized method of leveling a boom turret comprising:
determining a chassis angle of a chassis relative to a true downward direction,
determining an orientation set for a turntable leveling system such that a turntable angle will be equal in magnitude and opposite the chassis angle; and
instructing the turntable leveling system to rotate to the orientation set,
wherein rotating the turntable leveling system will level the boom turret.

18. The computerized method of claim 17,
wherein the orientation set of the turntable leveling system is set such that a turntable angle is equal in magnitude and opposite to the chassis angle,
wherein the turntable angle cancels the chassis angle so as to render a top portion of the turntable leveling system level with a true horizontal direction.

19. The computerized method of claim 17, further comprising:
determining, prior to deployment of an outrigger system, a ground angle of the chassis relative to the true downward direction; and
instructing the outrigger system to deploy such that a downhill outrigger extends further than an uphill outrigger,
wherein upon the outrigger system deploying the chassis is disposed at said chassis angle and the boom turret is partially leveled.

20. The computerized method of claim 19, further comprising:
determining that the chassis is capable of being leveled based upon the ground angle being less than a sum of a maximum chassis angle and a maximum turntable angle; and
preventing the outrigger system and the turntable leveling system from operating absent said determination that the chassis is capable of being leveled.

* * * * *